United States Patent
Xhafa et al.

(10) Patent No.: US 11,736,928 B2
(45) Date of Patent: Aug. 22, 2023

(54) WIRELESS MANAGEMENT OF MODULAR SUBSYSTEMS WITH PROXY NODE OPTIONS

(71) Applicant: Texas Instruments Incorporated, Dallas, TX (US)

(72) Inventors: Ariton E. Xhafa, Plano, TX (US); Ramanuja Vedantham, Frisco, TX (US); Jesus Daniel Torres Bardales, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 16 days.

(21) Appl. No.: 17/314,170

(22) Filed: May 7, 2021

(65) Prior Publication Data
US 2022/0360965 A1  Nov. 10, 2022

(51) Int. Cl.
*H04W 52/02* (2009.01)
*H04W 8/00* (2009.01)
*H04W 40/24* (2009.01)
*H04B 7/155* (2006.01)
*H04L 67/56* (2022.01)

(52) U.S. Cl.
CPC ........ *H04W 8/005* (2013.01); *H04B 7/15528* (2013.01); *H04L 67/56* (2022.05); *H04W 40/248* (2013.01)

(58) Field of Classification Search
None
See application file for complete search history.

(56) References Cited

U.S. PATENT DOCUMENTS

| | | | |
|---|---|---|---|
| 9,293,935 B2* | 3/2016 | Lee | H04Q 9/00 |
| 10,703,211 B2* | 7/2020 | Chuang | B60L 58/22 |
| 11,038,216 B2* | 6/2021 | Kwon | H01M 10/425 |
| 11,483,824 B2* | 10/2022 | Lee | H04W 72/0453 |
| 2016/0218866 A1 | 7/2016 | Patil | |
| 2019/0237816 A1* | 8/2019 | Kim | H02J 7/00032 |
| 2019/0265304 A1* | 8/2019 | Kim | B60L 58/12 |
| 2019/0273293 A1 | 9/2019 | Kim | |
| 2020/0396688 A1* | 12/2020 | Hong | H04B 17/318 |
| 2021/0043983 A1* | 2/2021 | Choi | G01R 31/3648 |
| 2021/0084675 A1* | 3/2021 | Aijaz | H04W 72/1273 |

(Continued)

OTHER PUBLICATIONS

International Standard, ISO 26262-1, "Road vehicles—Functional Safety", International Organization for Standardization, Second Addition, Dec. 2018, 42 pgs.

(Continued)

*Primary Examiner* — Sithu Ko
(74) *Attorney, Agent, or Firm* — Carl G. Peterson; Frank D. Cimino

(57) ABSTRACT

An integrated circuit for use in a wireless management system with a primary node and secondary nodes includes: a wireless transceiver; and a wireless management controller included with or coupled to the wireless transceiver. The wireless management controller is configured to: identify a first secondary node of the secondary nodes in communication with the primary node; identify a second secondary node of the secondary nodes not in communication with the primary node; and enable the first secondary node to operate as a proxy node that repeats downlink messages to or uplink messages from the second secondary node.

22 Claims, 6 Drawing Sheets

(56) References Cited

U.S. PATENT DOCUMENTS

| | | |
|---|---|---|
| 2021/0281988 A1* | 9/2021 | Han .................. B60L 58/10 |
| 2021/0319877 A1* | 10/2021 | Teng .................. A61B 5/4088 |
| 2022/0091062 A1* | 3/2022 | Gullapalli ............ G01R 31/007 |
| 2022/0113356 A1* | 4/2022 | Kasselman ....... H01M 10/4257 |
| 2022/0179001 A1* | 6/2022 | Park .................. H01M 10/425 |
| 2022/0332213 A1 | 10/2022 | Xhafa |

OTHER PUBLICATIONS

Xhafa, et al., "Wireless Protocol for Battery Management Systems", Texas Instruments, Jun. 4, 2019, 6 pgs.

Xhafa, et al., United States U.S. Appl. No. 17/820,441, "Mesh Network During Keep Alive in Wireless Battery Management System", filed Aug. 17, 2022.

Kunduru, et al., U.S. Appl. No. 17/823,138, "Multiple Primary Nodes for Wireless Battery Management System Robustness", filed Aug. 30, 2022.

Texas Instruments. CC2642R SimpleLink(TM) Bluetooth(R) 5.2 Low Energy Wireless MCU. SWRS194H—Jan. 2018—Revised Mar. 2021. 66 pages.

Xhafa, et al., "Enabling Data Integrity in Wireless Devices Connected to Battery Monitor", Texas Instruments, Jun. 4, 2019, 4 pgs.

EM Microelectronic, EM9301 Datasheet, 2018, 51 pages (Year: 2018).

Song et al. "The AES-CMAC Algorithm", National Institute of Standards and Technology (NIST), 2006, "https://www.rfc-editor.org/ rfc/pdfrfc/rfc4493.txt.pdf", 20 pages (Year: 2006).

Nordic semiconductor, nRF25840 Datasheet, 2018, 551 pages (Year: 2018).

\* cited by examiner

WIRELESS MANAGEMENT OF MODULAR SUBSYSTEMS WITH PROXY NODE OPTIONS

BACKGROUND

As new electronic devices are developed and integrated circuit (IC) technology advances, new IC products are commercialized. One example IC product for electronic devices is a wireless transceiver or related controllers. There are many different wireless communication protocols and related wireless transceivers to support different ranges of wireless data transmission, different levels of security, frequencies used, and/or other variations.

In a conventional wired battery management system, rechargeable batteries are managed by circuitry for the safe and efficient operation of the batteries in real-life applications, such as electric vehicles. Also, wired communication interfaces are used to connect a main microcontroller to each battery module, and each battery module is chained to the rest of the battery modules in a daisy chain. With wired communication interfaces, the main microcontroller cannot monitor and control all the battery modules in parallel without complex wiring. This wiring makes repair or replacement of individual battery cells more difficult.

Use of a wireless connection between the battery modules and the microcontroller has been proposed to make management of battery modules more flexible and easier to repair. In a wireless battery management system (WBMS), a microcontroller monitors each battery module and communicates with the battery modules using wireless communication interfaces. The main microcontroller controls all the battery modules using a WBMS protocol. Wireless communication interfaces can suffer from wireless communication channel bandwidth variance, interference, and/or other issues, which would prevent proper monitoring and management in a WBMS.

SUMMARY

In at least one example, an integrated circuit for use in a wireless management system with a primary node and secondary nodes includes: a wireless transceiver; and a wireless management controller included with or coupled to the wireless transceiver. The wireless management controller is configured to: identify a first secondary node of the secondary nodes in communication with the primary node; identify a second secondary node of the secondary nodes not in communication with the primary node; and enable the first secondary node to operate as a proxy node that repeats downlink messages to or uplink messages from the second secondary node.

In another example, a system comprises: modular subsystems, each of the modular subsystems having a respective monitored electrical component; a controller for the modular subsystems; and a wireless management system for the modular subsystems. The wireless management system has: a primary node coupled to the controller; and secondary nodes, each secondary node coupled to or included with a respective modular subsystem of the modular subsystems. The primary node is configured to: identify a first secondary node of the secondary nodes in communication with the primary node; identify a second secondary node of the secondary nodes not in communication with the primary node; and direct the first secondary node to operate as a proxy node that repeats downlink messages to or uplink messages from the second secondary node.

In yet another example, a method for use in a wireless management system with a primary node and secondary nodes comprises: identifying, by the primary node, a first secondary node of the secondary nodes in communication with the primary node; and identifying, by the primary node, a second secondary node of the secondary nodes not in communication with the primary node. The method also comprises using the first secondary node as a proxy node that repeats downlink messages to or uplink messages from the second secondary node.

BRIEF DESCRIPTION OF THE DRAWINGS

The same reference numbers are used in the drawings to depict the same or similar (structurally and/or functionally) features.

DETAILED DESCRIPTION

Described herein is a proxy node technique for a wireless management system with a primary node and secondary nodes. The described technique involves: identifying a first secondary node of the secondary nodes that is in communication with the primary node; and identifying a second secondary node of the secondary nodes that is not in communication with the primary node. The first secondary node is used as a proxy node that repeats downlink messages to or uplink messages from the second secondary node. In some example embodiments, the first secondary node repeats downlink messages to or uplink messages from the second secondary node during an uplink interval of the first secondary node. In other example embodiments, the first secondary node repeats downlink messages to or uplink messages from the second secondary node during one or more proxy node intervals.

In some example embodiments, a system includes modular subsystems, each of the modular subsystems having a respective monitored electrical component (e.g., a rechargeable battery or other monitored electrical component). The system also includes a controller for the modular subsystems. The system also includes a wireless management system for the modular subsystems. The wireless management system includes: a primary node coupled to the controller; and secondary nodes, each secondary node coupled to a respective modular subsystem of the modular subsystems. The primary node is configured to: identify a first secondary node of the secondary nodes in communication with the primary node; identify a second secondary node of the secondary nodes not in communication with the primary node; and direct the first secondary node to operate as a proxy node that repeats downlink messages to or uplink messages from the second secondary node.

In some example embodiments, an integrated circuit for use in a wireless management system includes: a wireless transceiver; and a wireless management controller included with or coupled to the wireless transceiver. The wireless management controller is configured to: identify a first secondary node of the secondary nodes in communication with the primary node; identify a second secondary node of the secondary nodes not in communication with the primary node; and enable the first secondary node to operate as a proxy node that repeats downlink messages to or uplink messages from the second secondary node. In some example embodiments, such an integrated circuit with related wireless transceiver and wireless management controller is configured to operate as a primary node that supports the described proxy node operations. In other example embodiments, such an integrated circuit with related wireless transceiver and wireless management controller is configured to operate as a secondary node that supports the described proxy node operations.

Figure 1:
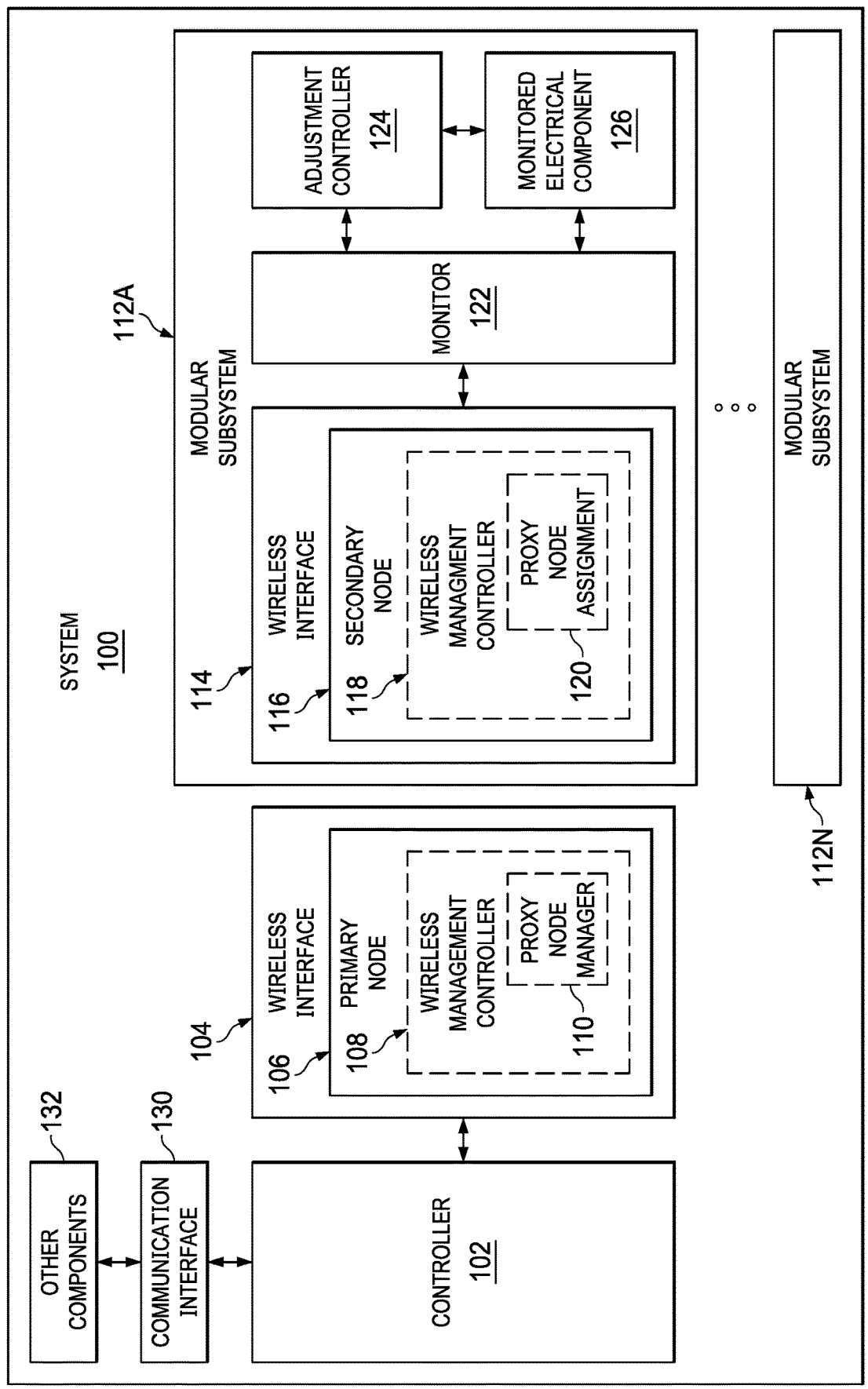
FIG. 1 is a block diagram of a system with wireless management of modular subsystems in accordance with an example embodiment.

FIG. 1 is a block diagram of a system 100 with wireless management of modular subsystems 112A-112N in accordance with an example embodiment. As shown, the system 100 includes a controller 102 coupled to a wireless interface 104 with a primary node 106. The primary node 106 performs proxy management operations using a wireless management controller 108 with a proxy node manager element 110. The wireless management controller 108 with the proxy node manager element 110 include hardware, software, and/or instructions configured to perform messaging and proxy node management for communications to or from the modular subsystems 112A-112N.

As shown, the modular subsystem 112A includes a wireless interface 114 with a secondary node 116. The secondary node 116 performs messaging and proxy node operations using wireless management controller 118 with proxy node assignment element 120. The wireless management controller 118 with the proxy node assignment element 120 include hardware, firmware, and/or software configured to perform uplink messaging from the modular subsystem 112A to the primary node 106 as well as proxy node operations as needed. In some example embodiments, the proxy node operations are based on assignment from the primary node 106. Once assigned, the secondary node 116 performs its own uplink messaging as well as repeating downlink messages to and/or repeating uplink messages from another secondary node that is unable to communicate directly with the primary node 106.

In the example of FIG. 1, the modular subsystem 112A includes a monitored electrical component 126. In some example embodiments, the monitored electrical component 126 is a rechargeable battery or another component with a variable status. To account for the variable status of the monitored electrical component 126, the modular subsystem 112A includes a monitor 122 configured to monitor parameters or operations of the monitored electrical component 126. The modular subsystem 112A also includes an adjustment controller 124 configured to make adjustments to the monitored electrical component 126.

Without limitation, each of the modular subsystems 112B-112N may have the same topology as the modular subsystem 112A. As desired, the functionality of monitored electrical components, such as the monitored electrical component 126, for each of the modular subsystems 112B-112N is combined and the combined functionality of all of the monitored electrical components is also monitored and adjusted as needed. Over time, the performance of the monitored electrical components and/or other components of the modular subsystem 112A-112N may degrade. In such case, adjustment or replacement of a specific monitored electrical component or other components of a given modular subsystem may be needed. By using the wireless interfaces 104 and 114, such replacement is facilitated (i.e., fewer wired connections are used) while supporting monitoring, adjustment, status update, parameter transfer, and/or data storage operations for the monitored electrical components of the modular subsystems 112A-112N. The use of proxy node operations in the system 100 ensures ongoing wireless management of the modular subsystems 112A-112N and related monitored electrical components (e.g., the monitored electrical component 126) even if one or more of the wireless interfaces of the system 100 is unable to communicate with the primary node 106 for a time (e.g., due to wireless communication channel unavailability, interference, or other issues).

In FIG. 1, the controller 102 is also coupled to other components 132 via a communication interface 130. An example of the other components 132 is an electronic control unit (ECU), which manages the electrical subsystems of a vehicle or other system responsive to the ongoing status and operations of the modular subsystems 112A-112N.

Figure 2:
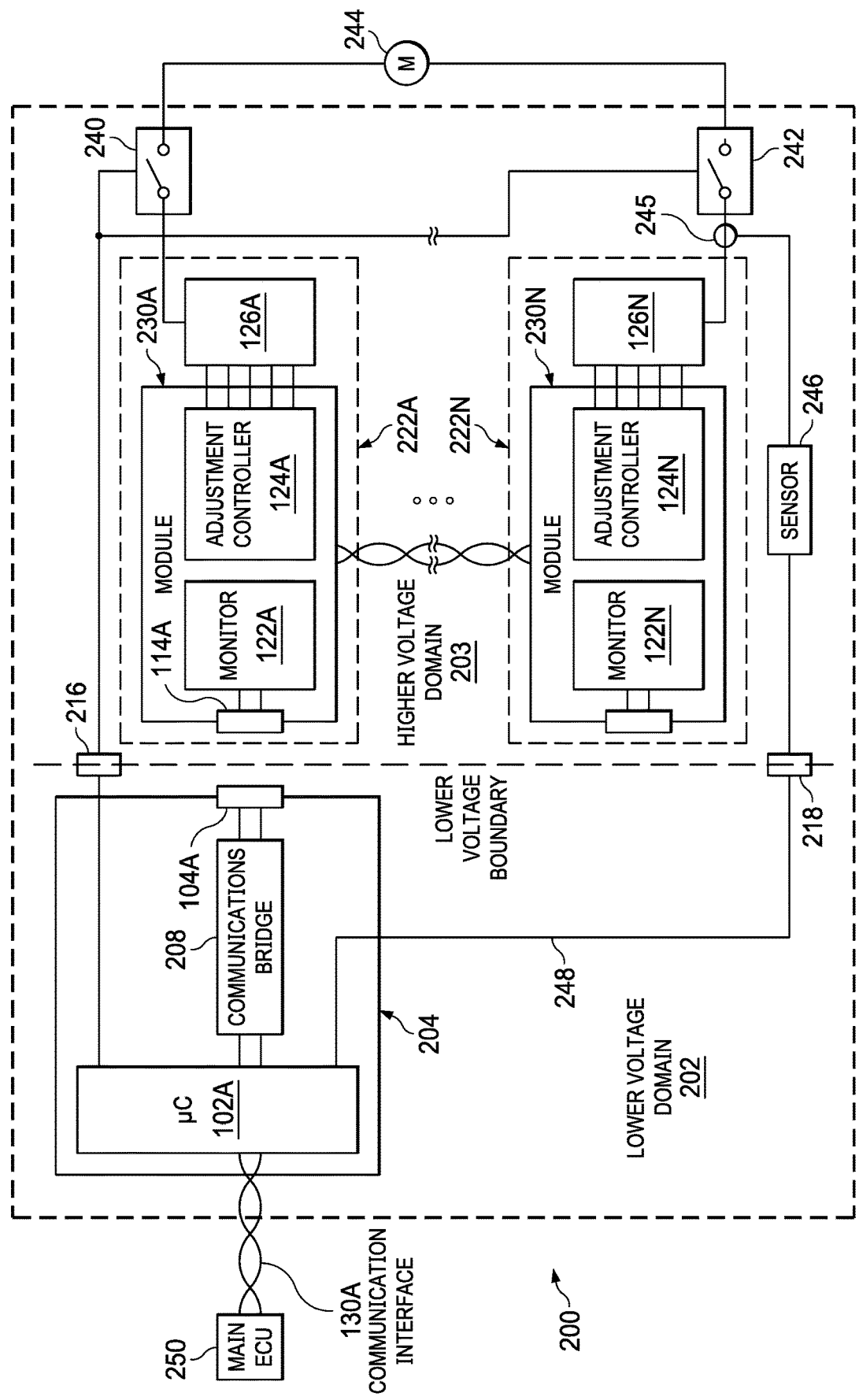
FIG. 2 is a block diagram of another system with wireless management of modular subsystems in accordance with an example embodiment.

FIG. 2 is a block diagram of a system 200 with wireless management of modular subsystems 222A-222N (examples of the modular subsystems 112A-112N in FIG. 1) in accordance with another example embodiment. In FIG. 2, the system 200 includes a lower voltage (e.g., 12, 24, or 48 volts) domain 202 with a control circuit 204. In the example of FIG. 2, the modular subsystems 222A-222N are in a higher voltage (e.g., several hundreds of volts) domain 203 compared to the control circuit 204. As shown, the control circuit 204 includes a microcontroller 102A (an example of the controller 102 in FIG. 1) and a wireless interface 104A (an example of the wireless interface 104 in FIG. 1). The control circuit 204 also includes a communications bridge 208 between the microcontroller 102A and the wireless interface 104A. In the example of FIG. 2, a main ECU 250 for the system 200 is coupled to the control circuit 204 via a communication interface 130A (an example of the communication interface 130 in FIG. 1). In operation, the wireless interface 104A performs proxy node management operations as described herein.

As shown, the modular subsystem 222A includes a module 230A, such as a printed circuit board (PCB) or other circuit, with a wireless interface 114A (an example of the wireless interface 114 in FIG. 4), a monitor 122A (an example of the monitor 122 in FIG. 1), and an adjustment controller 124A (an example of the adjustment controller 124 in FIG. 1). The module 230A is coupled to a monitored electrical component 126A (an example of the monitored electrical component 126 in FIG. 1). The modular subsystems 222B-222N each include a respective module 230B-230N coupled to a respective monitored electrical component 126B-126N. In some example embodiments, the monitored electrical components 126A-126N are rechargeable batteries or other components with a variable status. Without limitation, each the modules 230B-230N include the same type of components as the module 230A (e.g., wireless interface, a monitor, and an adjustment controller).

In FIG. 2, the wireless interface 104A includes a primary node, and each of the wireless interfaces 114A-1114N include a secondary node as described herein. Also, the monitored electronic components 126A-126N may be coupled together to provide a combined function. As shown, the system 200 includes switches 240, 242, and component 244. In some example embodiments, the component 244 is a motor/engine. In this case, closing the circuit at switches 240 and 242, results in current flowing through the engine/motor to operate a vehicle. During the parking or when the car is OFF, the circuit is open and no energy is wasted. The switches 240 and 242 are controlled by a control signal from the microcontroller 102A, which is conveyed to the switches 240 and 242 via interface 216. In FIG. 2, the microcontroller 102A also receives a current sense signal 248 via interface 218, where the current sense signal 248 is generated from a loop 244 or related sensor 246.

In operation, the wireless interface 104A is configured to perform primary node proxy node management operations. Also, the wireless interface 114A is configured to perform proxy node assignment operations. As desired, the functionality of the monitored electrical components 126A-126N is combined and the combined functionality of all of the monitored electrical components is also monitored and adjusted. Over time, the performance of the monitored electrical components 126A-126N and/or other components of the modular subsystem 222A-222N may degrade. In such case, adjustment or replacement of a specific monitored electrical component or other components of a given modular subsystem may be needed. By using the wireless interfaces 104A and 114A, such replacement is facilitated while supporting monitoring, adjustment, status update, parameter transfer, and/or data storage operations for the monitored electrical components 126A-126N of the modular subsystems 222A-222N. The use of one or more proxy nodes in the system 200 enables ongoing wireless management of the modular subsystems 222A-222N, even if one or more wireless communication channels between the network interface 104A and 114A is unavailable.

Figure 3:
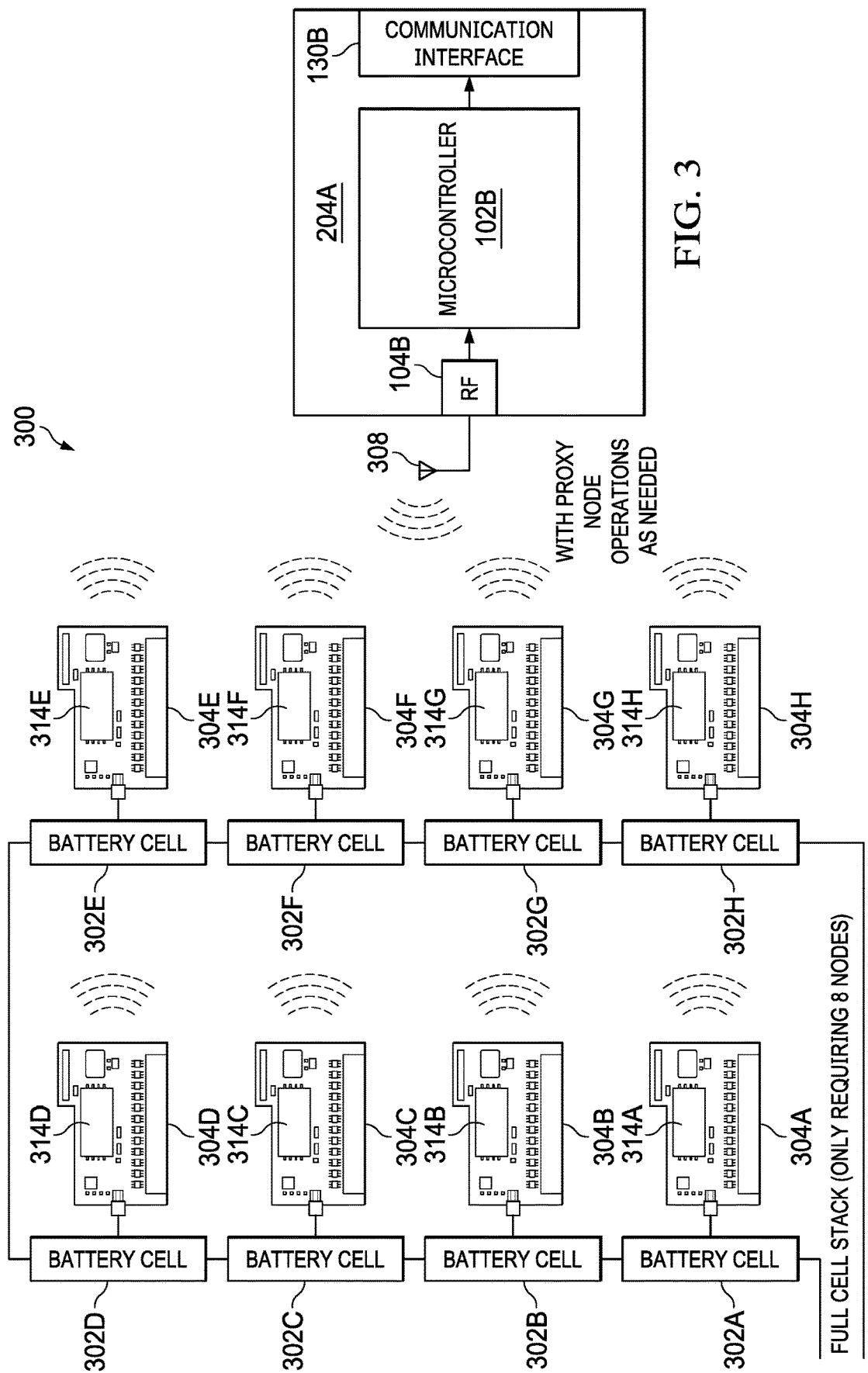
FIG. 3 is a diagram of a wireless battery management system (WBMS) in accordance with an example embodiment.

FIG. 3 is a diagram of a wireless battery management system (WBMS) 300 in accordance with an example embodiment. As shown, the WBMS 300 includes battery cells 302A-302H (e.g., Li-ion cells) in series. Each of the battery cells 302A-302H is coupled to a respective module 304A-304H (examples of the modules 222A-222N) to form respective modular subsystems (e.g., the battery cell 302A and the module 304A is an example of the modular subsystem 112A in FIG. 1, or the modular subsystem 222A in FIG. 2). Each of the modules 302A-302H includes a respective wireless interface 314A-314H (examples of the wireless interface 114 in FIG. 1, or the wireless interface 114A in FIG. 2) to perform monitoring, adjustment, and/or wireless communication operations, including proxy node operations as described herein. The WBMS 300 also includes a control circuit 204A (an example of the control circuit 204 in FIG. 2) with a microcontroller 102B (an example of the microcontroller 102 in FIG. 1), a wireless transceiver 104B (an example of the wireless transceiver 104 in FIG. 1), and a communication interface 130B (an example of the communication interface 130 in FIG. 1). The control circuit 204A is coupled to an antenna 308 for wireless communications with the modules 304A-304H. In operation, the wireless transceiver 104B is configured to perform proxy node management as described herein.

With the WBMS 300, the functionality of the battery cells 302A-302H is combined and the combined functionality of all of the battery cells 302A-302H is monitored and adjusted. Over time, the performance of the battery cells 302A-302H may degrade. In such case, adjustment or replacement of a specific one of the battery cells 302A-302H or other components of the modular subsystems may be needed. By using the wireless interfaces 104B and respective wireless interfaces of the modules 304A-304H, such replacement is facilitated while supporting monitoring, adjustment, status update, parameter transfer, and/or other operations related to the battery cells 302A-302H. The use of proxy node operations in the WBMS 300 helps ensure ongoing wireless management for the battery cells 302A-302H even if a particular module of the modules 304A-304H is unable to communicate with the wireless transceiver 104B (e.g., due to a respective wireless communication channel being poor quality, interference, or other issues). In such case, a module that is able to communicate with the wireless transceiver 104B is assigned to perform proxy node operations. The proxy node operations involve repeating downlink messages to or uplink message from the module that is unable to communicate directly with the wireless transceiver 104B.

In FIG. 3, the control circuit 204A includes an integrated circuit with a wireless transceiver 104B configured to operate as the primary node of the WBMS 300. Also, each of the modules 304A-304H includes a respective integrated circuit with a wireless interface (a respective one of the wireless interfaces 314A-314H) configured to operate as secondary nodes of the WBMS 300. For example, each of the integrated circuits of the WBMS 300 may include hardware, firmware, and/or software configured to perform the wireless management and proxy node operations described herein.

In some example embodiments, each of the wireless interfaces 104 and 114 in FIG. 1, the wireless interfaces 104A and 114B in FIG. 2, and the wireless interfaces 104B and wireless interfaces 314A-314H in FIG. 3 is part of a respective integrated circuit that includes a wireless transceiver and a wireless management controller (e.g., the wireless management controller 108 or the wireless management controller 118 in FIG. 1). Each wireless management controller is configured to: identify a first secondary node of the secondary nodes in communication with the primary node; identify a second secondary node of the secondary nodes not in communication with the primary node; and enable the first secondary node to operate as a proxy node that repeats downlink messages to or uplink messages from the second secondary node.

In some example embodiments, a wireless management controller, operating as controller of a primary node, causes the primary node to transmit a proxy node assignment to the first secondary node after the first and second secondary nodes are identified. In some example embodiments, a wireless management controller, operating as controller of the first secondary node, causes the first secondary node to repeat a downlink message from the primary node to the second secondary node during an uplink interval of the first secondary node. In some example embodiments, a wireless management controller, operating as controller of the first secondary node, causes the first secondary node to repeat an uplink message from the second secondary node to the primary node during an uplink interval of the first secondary node. In some example embodiments, the wireless management controller, operating as controller of the first secondary node, causes the first secondary node to: transmit an uplink message to the primary node during an uplink interval of the first secondary node; repeat a downlink message from the primary node to the second secondary node during the uplink interval of the first secondary node; and repeat an uplink message from the second secondary node to the primary node during the uplink interval of the first secondary node.

In some example embodiments, a wireless management controller, operating as controller of the first secondary node, causes the first secondary node to repeat a downlink message from primary node to the second secondary node during a downlink proxy node interval separate from a downlink interval of the primary node and uplink intervals of the secondary nodes. In some example embodiments, a wireless management controller, operating as controller of the first secondary node, causes the first secondary node to repeat an uplink message from the second secondary node to the primary node during an uplink proxy node interval separate from a downlink interval of the primary node and uplink intervals of the secondary nodes. In some example embodiments, a wireless management controller, operating as controller of the first secondary node, causes the first secondary node to: repeat an uplink message from the second secondary node to the primary node during a proxy node interval separate from a downlink interval of the primary node and uplink intervals of the secondary nodes; and repeat a downlink message from primary node to the second secondary node during the proxy node interval. Other proxy node operations are possible.

In some example embodiments, a system (e.g., system 100 in FIG. 1, system 200 in FIG. 2, or WBMS 300 in FIG. 3) includes modular subsystems (e.g., the modular subsystems 112A-112N in FIG. 1, or the modular subsystems 222A-222N in FIG. 2), each of the modular subsystems having a respective monitored electrical component (e.g., the monitored electrical component 126 in FIG. 1, or the monitored electrical components 126A-126N). The system also includes a controller (e.g., controller 102 in FIG. 1, microcontroller 102A in FIG. 2, or microcontroller 102B in FIG. 3) for the modular subsystems. The system also includes a wireless management system (e.g., the wireless interfaces 104 and 114 in FIG. 1, the wireless interfaces 104A and 114B in FIG. 2, or the wireless interfaces 104B and 314A-314H in FIG. 3) for the modular subsystems. The wireless management system has: a primary node coupled to the controller; and a fixed set of secondary nodes, each secondary node coupled to or included with a respective modular subsystem of the modular subsystems. The wireless management system is configured to: establish a first network that defines the primary node and a fixed set of secondary nodes; and in response to a proxy node trigger, establish a second network that adds a proxy node capability to a given secondary node of the fixed set of secondary nodes.

In some example embodiments, the proxy node trigger is initiated by one of the fixed set of secondary nodes. In some example embodiments, the proxy node trigger is initiated by the primary node. In some example embodiments (e.g., in a multi-hop wireless network), the primary node is configured to: receive a routing advertisement frame from one of the secondary nodes of the fixed set of secondary nodes; and generate the proxy node trigger based on the routing advertisement frame. In some example embodiments, the wireless management system is configured to: identify a first secondary node of the fixed set of secondary nodes that is in communication with the primary node; identify a second secondary node of the fixed set of secondary nodes that is not in communication with the primary node; and enable the first secondary node to operate as a proxy node that repeats downlink messages to or uplink messages from the second secondary node.

In some example embodiments, the first secondary node is configured to aggregate an uplink message of the first secondary node with an uplink message of the second secondary node. In some example embodiments, the first secondary node is configured to aggregate a downlink message of the primary node with an uplink message of the first secondary node. In some example embodiments, the first secondary node is configured to repeat a downlink message from the primary node to the second secondary node during a downlink proxy node interval separate from a downlink interval of the primary node and uplink intervals of the secondary nodes. In some example embodiments, the first secondary node is configured to repeat an uplink message from the second secondary node to the primary node during an uplink proxy node interval separate from a downlink interval of the primary node and uplink intervals of the secondary nodes. In some example embodiments, each respective monitored electrical component is a rechargeable battery.

Figure 4:
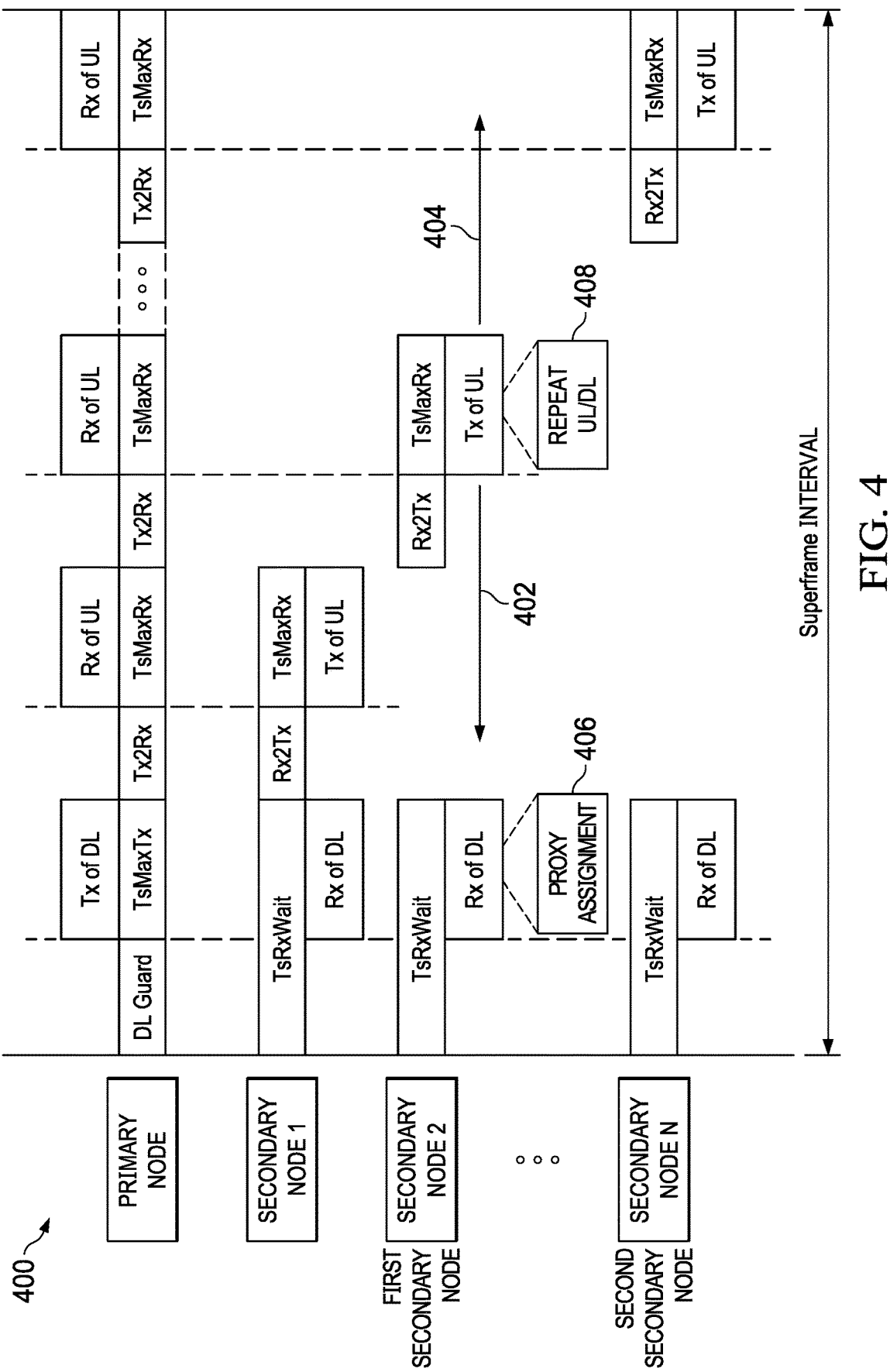
FIG. 4 is a diagram of a wireless management network protocol in accordance with an example embodiment.

FIG. 4 is a diagram of a wireless management network protocol 400 in accordance with an example embodiment. The protocol 400 supports data exchanges between a primary node and N-secondary nodes in a wireless management system or WBMS. In FIG. 4, time is divided into slots and the primary node transmits packets in the downlink (DL) slot, while the secondary nodes transmit their data packets in the uplink (UL) slots. The time interval that includes a single DL slot (for the primary node to transmit) and respective UL slots for the secondary nodes to transmit their packets is called a Superframe interval.

In FIG. 4, secondary node 2 has been identified as a first secondary node that is in communication with the primary node, and the secondary node N has been identified as a second secondary node that is not in communication with the primary node. Accordingly, the secondary node 2 receives an assignment (block 406) from the primary node to operate as a proxy node for the secondary node N. Subsequently, during its uplink interval, the secondary node 2 performs proxy node operations (block 408) by repeating a downlink message to and/or an uplink message from the secondary node N. In some example embodiments, the timing of the uplink interval can be adjusted forwards (indicator 402) or backwards (indicator 404) to facilitate use of the secondary node 2 for proxy node operations. For example, if the interval for the first secondary node is after the interval for the second secondary node, the uplink data sent by the second secondary node can be forwarded (by the first secondary node) to the primary node in the same Superframe interval. In other scenario, where the second secondary node is ahead in its allocated slot relative to the first secondary node, the downlink message that the second secondary node receives needs to be within the same Superframe interval.

In some example embodiments, if secondary Node N is the one not able to communicate with the primary node, but the secondary node 2 is able to hear both the primary node and the secondary Node N (due to its position relative to both), then secondary node 2 can perform proxy node operations by adding to its UL packet the following information: DL content from the DL frame sent by the primary node; and/or UL content from the UL frame sent by Node N. Because WBMS allows for packet aggregation, this is doable, however, prioritization of the content sent by proxy node operations may be needed. If the UL frame length of the secondary node 2 is not sufficient, proxy node operations may include determining which content to send first Example priority options include: DL content from the primary node, data of the secondary node 2, or UL content from the secondary node N. This decision can be made at the secondary node 2 based on the delays for each of the content.

As an example, if DL content includes command data that motivates immediate reception, then DL content is included first and any additional data is added based on space in the UL frame of the secondary node 2.

At the primary node, once a UL packet is received from secondary node 2, the primary node is able to separate the DL content that is repeated (since it was already sent by the primary node), UL content from the second node 2, and UL content from the secondary node N. The same process happens at the secondary node N as well. The secondary node N will be able to distinguish between the content of the aggregated data. This can be done via additional fields/flags/frame types added to the UL frame sent by the secondary node 2.

Figure 5:
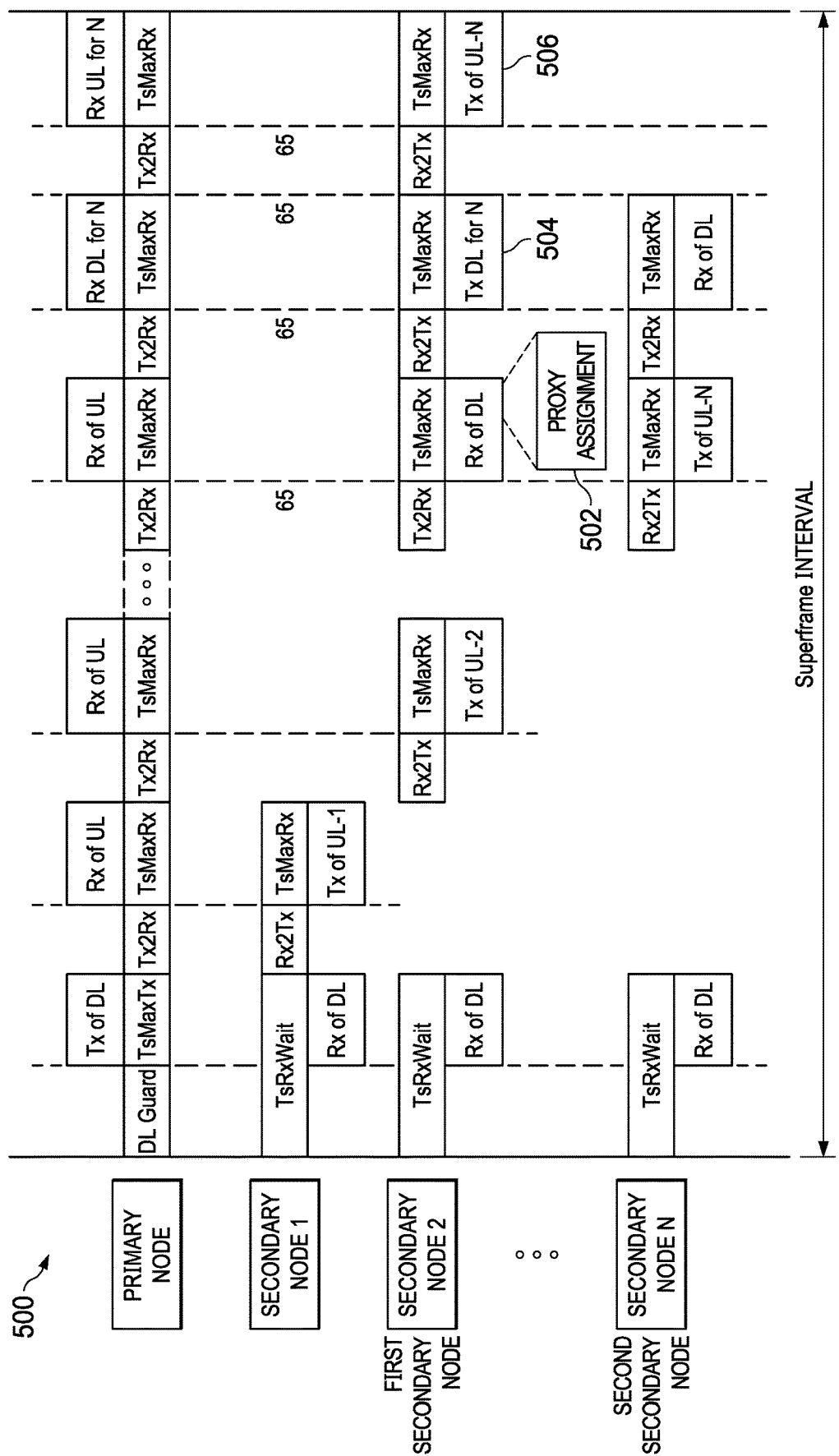
FIG. 5 is a diagram of another wireless management network protocol in accordance with an example embodiment.

FIG. 5 is a diagram of a wireless management network protocol 500 in accordance with an example embodiment. The protocol 500 supports data exchanges between a primary node and N-secondary nodes in a wireless management system or WBMS. In FIG. 5, time is divided into slots and the primary node transmits packets in the DL slot, while the secondary nodes transmit their data packets in the UL slots. The time interval that includes a single DL slot (for the primary node to transmit) and respective UL slots for the secondary nodes to transmit their packets is called a Superframe interval.

In FIG. 5, secondary node 2 has been identified as a first secondary node that is in communication with the primary node, and the secondary node N has been identified as a second secondary node that is not in communication with the primary node. Accordingly, the secondary node 2 receives an assignment (block 502) from the primary node to operate as a proxy node for secondary node N. Subsequently, during a proxy node downlink interval 504, the secondary node 2 performs proxy node operations by repeating a downlink message from the primary node to the secondary node N. Also, during a proxy node uplink interval 506, the secondary node 2 performs proxy node operations by repeating an uplink message from the secondary node N to the primary node. As another option, one proxy node interface separate from the DL interval of the primary node and the UL intervals of the secondary nodes is used to repeat uplink and/or downlink messages to the secondary node N.

In some example embodiments, a single additional proxy node interval is utilized for proxy node operations, where DL content and UL content are both included in the packet. In such case, there is a Superframe delay for the content received from the secondary node N. With a single additional proxy node interval, the secondary node 2 can use its UL slot to transmit DL content to the secondary node N and use the additional proxy node slot to transmit both UL contents (from the secondary node 2 and the secondary node N) to the primary node. As another option, with a single additional proxy node interval, the secondary node 2 can use its UL slot to transmit DL content and its own UL content. The single additional proxy node interval is then used to transmit UL content from secondary node N.

In some example embodiments, there is more than one secondary node not being able to reach the primary node. If there are two such secondary nodes, then wireless management systems may use the two UL intervals for the secondary nodes to transmit a combination of DL content and UL content from each node. As another option, if a single additional proxy node interval is available, then: 1) DL content and its own UL content is transmitted during the UL interval of the secondary node 2; and 2) the single additional proxy node interval is used to transmit both UL contents from both secondary nodes that are not able to reach the primary node. As another option, if two additional proxy node intervals are available for use by the two secondary nodes that are unable to reach the primary node, each of these secondary nodes may use one of the available additional proxy node intervals for DL content and/or UL content. With each additional node being added to the hop extension, one or two additional proxy node intervals may be used.

In a conventional beacon system, a stringent allocation is used (i.e., the number of slots or Superframe size is set at the start of the network. For a WBMS network and a given enclosure, the number of nodes to be included in the given enclosure is known beforehand. For example, an enclosure may need 10 secondary nodes and 1 primary node. In this case, the WBMS will setup the network with 1 DL and 10 UL. Conventional wireless networks do not accommodate on-the-fly updates to the network (i.e., the Superframe is fixed and does not change once set). However, in the described approach changes to the Superframe are supported including the number of slots that are allocated. This improves efficiency and delay in the network. In addition, for multi-hop wireless networks, the primary node is not aware of the secondary nodes not being able to connect. Rather, that solution is done via routing advertisement frames. In other words, a secondary node (the secondary node that needs help or a secondary node that is able to help) may initiate a proxy node trigger and related operations. On the other hand, in a WBMS scenario or other one-hop scenario, the primary node is aware of the secondary nodes to be connected. Hence, in these scenarios, the primary node initiates a proxy node trigger and related operations. Another feature that is supported in the described solution is the aggregation of data by a proxy node (e.g., to convey data from multiple secondary nodes or from the primary node and secondary nodes). The described proxy node options for WBMS or other embodiments supports aggregation of such data because of other intrinsic features (e.g., encryption key).

Figure 6:
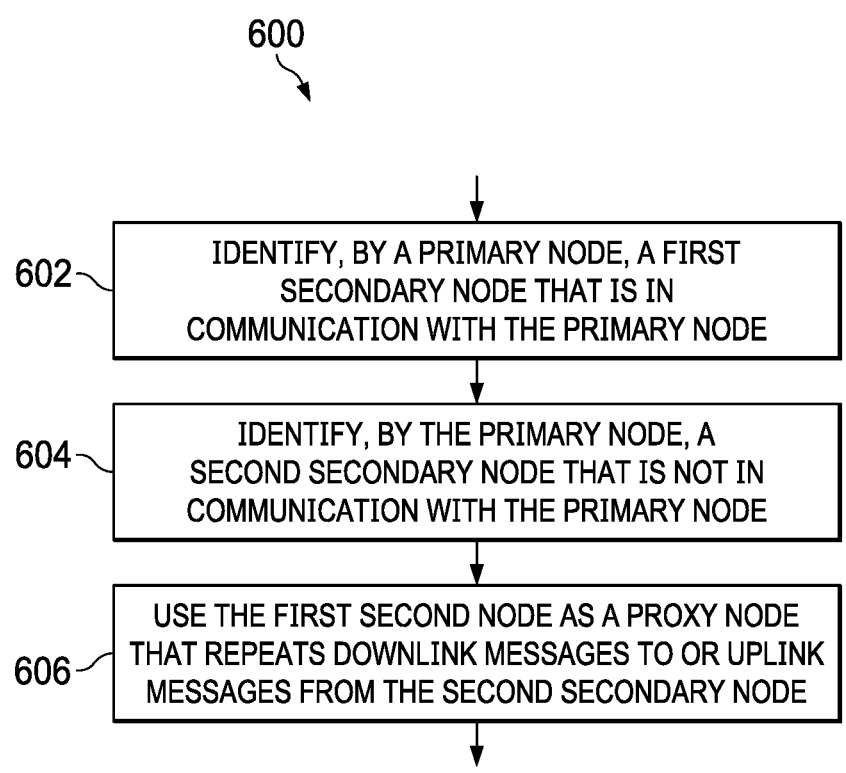
FIG. 6 is a flowchart of a wireless management system method in accordance with an example embodiment.

FIG. 6 is a flowchart of a wireless management system method 600 in accordance with an example embodiment. The method 600 is performed by a primary node and secondary nodes (or respective wireless interfaces, circuitry, integrated circuits, etc.) of a wireless management system. As shown, the method 600 includes identifying, by a primary node, a first secondary node that is in communication with the primary node at block 602. At block 604, the primary node identifies a second secondary node that is not in communication with the primary node. At block 606, the first secondary node is used as a proxy node that repeats downlink messages to or uplink messaged from the second secondary node.

In some example embodiments, the method 600 includes transmitting, by the primary node, a proxy node assignment to the first secondary node after the first and second secondary nodes are identified. In some example embodiments, the method 600 includes using, by the first secondary node, an uplink interval of the first secondary node to repeat downlink messages to or uplink messages from the second secondary node. In some example embodiments, the method 600 includes using, by the first secondary node, a proxy node interval separate from a downlink interval of the primary node and uplink intervals of the secondary nodes to repeat downlink messages to or uplink messages from the second secondary node.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

Modifications are possible in the described embodiments, and other embodiments are possible, within the scope of the claims.

What is claimed is:

1. An electronic circuit for use in a wireless management system with a primary node and secondary nodes, comprising:
    a wireless transceiver; and
    a wireless management controller configured to:
        identify a first secondary node of the secondary nodes that is in communication with the primary node;
        identify a second secondary node of the secondary nodes that is not in communication with the primary node;
        enable the first secondary node to operate as a proxy node that repeats downlink messages to or uplink messages from the second secondary node; and
        cause the first secondary node to repeat a downlink message from the primary node to the second secondary node during an uplink interval of the first secondary node.

2. The electronic circuit of claim 1, wherein the wireless management controller, operating as controller of the primary node, causes the primary node to transmit a proxy node assignment to the first secondary node after the first and second secondary nodes are identified.

3. The electronic circuit of claim 1, wherein the wireless management controller, operating as controller of the first secondary node, causes the first secondary node to repeat an uplink message from the second secondary node to the primary node during an uplink interval of the first secondary node.

4. The electronic circuit of claim 1, wherein the wireless management controller, operating as controller of the first secondary node, causes the first secondary node to:
    transmit an uplink message to the primary node during an uplink interval of the first secondary node; and
    repeat an uplink message from the second secondary node to the primary node during the uplink interval of the first secondary node.

5. The electronic circuit of claim 1, wherein the wireless management controller, operating as controller of the first secondary node, causes the first secondary node to repeat a downlink message from the primary node to the second secondary node during a downlink proxy node interval separate from a downlink interval of the primary node and uplink intervals of the secondary nodes.

6. The electronic circuit of claim 1, wherein the wireless management controller, operating as controller of the first secondary node, causes the first secondary node to repeat an uplink message from the second secondary node to the primary node during an uplink proxy node interval separate from a downlink interval of the primary node and uplink intervals of the secondary nodes.

7. The electronic circuit of claim 1, wherein the wireless management controller, operating as controller of the first secondary node, causes the first secondary node to:
    repeat an uplink message from the second secondary node to the primary node during a proxy node interval separate from a downlink interval of the primary node and uplink intervals of the secondary nodes; and
    repeat a downlink message from the primary node to the second secondary node during the proxy node interval.

8. The electronic circuit of claim 1, wherein the electronic circuit is integrated in an integrated circuit.

9. The electronic circuit of claim 1, wherein the wireless transceiver comprises the wireless management controller.

10. A system, comprising:
    modular subsystems, each of the modular subsystems having a respective monitored electrical component;
    a controller for the modular subsystems; and
    a wireless management system for the modular subsystems, the wireless management system having:
        a primary node coupled to the controller; and
        a set of secondary nodes, each secondary node coupled to or included with a respective modular subsystem of the modular subsystems,
        wherein the wireless management system is configured to:
            establish a first network that defines the primary node and the set of secondary nodes; and
            in response to a proxy node trigger, establish a second network that adds a proxy node capability to a given secondary node of the set of secondary nodes, wherein a first secondary node is configured to aggregate a downlink message of the primary node with an uplink message of the first secondary node.

11. The system of claim 10, wherein the proxy node trigger is initiated by one of the set of secondary nodes.

12. The system of claim 10, wherein the proxy node trigger is initiated by the primary node.

13. The system of claim 10, wherein the primary node is configured to:
    receive a routing advertisement frame from one of the secondary nodes of the set of secondary nodes; and
    generate the proxy node trigger based on the routing advertisement frame.

14. The system of claim 10, wherein the wireless management system is configured to:
    identify the first secondary node of the set of secondary nodes that is in communication with the primary node;
    identify a second secondary node of the set of secondary nodes that is not in communication with the primary node; and
    enable the first secondary node to operate as a proxy node that repeats downlink messages to or uplink messages from the second secondary node.

15. The system of claim 14, wherein the first secondary node is configured to aggregate an uplink message of the first secondary node with an uplink message of the second secondary node.

16. The system of claim 14, wherein the first secondary node is configured to repeat a downlink message from the primary node to the second secondary node during a downlink proxy node interval separate from a downlink interval of the primary node and uplink intervals of the secondary nodes.

17. The system of claim 14, wherein the first secondary node is configured to repeat an uplink message from the second secondary node to the primary node during an uplink proxy node interval separate from a downlink interval of the primary node and uplink intervals of the secondary nodes.

18. The system of claim 10, wherein each respective monitored electrical component is a rechargeable battery.

19. The system of claim 10, wherein the set of secondary nodes has a fixed number of secondary nodes.

20. A method for use in a wireless management system with a primary node and secondary nodes, the method comprising:
- identifying, by the primary node, a first secondary node of the secondary nodes that is in communication with the primary node;
- identifying, by the primary node, a second secondary node of the secondary nodes not in communication with the primary node;
- using the first secondary node as a proxy node that repeats downlink messages to or uplink messages from the second secondary node; and
- using, by the first secondary node, an uplink interval of the first secondary node to repeat downlink messages to or uplink messages from the second secondary node.

21. The method of claim 20, further comprising transmitting, by the primary node, a proxy node assignment to the first secondary node after the first and second secondary nodes are identified.

22. The method of claim 20, further comprising using, by the first secondary node, a proxy node interval separate from a downlink interval of the primary node and uplink intervals of the secondary nodes to repeat downlink messages to or uplink messages from the second secondary node.

* * * * *